US008980991B2

(12) United States Patent
Lin et al.

(10) Patent No.: US 8,980,991 B2
(45) Date of Patent: *Mar. 17, 2015

(54) INTERMEDIATE TRANSFER MEMBERS COMPRISED OF HYDROPHOBIC CARBON NANOTUBES

(75) Inventors: Liang-Bih Lin, Rochester, NY (US); Daniel Levy, Rochester, NY (US); Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 957 days.

This patent is subject to a terminal disclaimer.

(21) Appl. No.: 11/760,354

(22) Filed: Jun. 8, 2007

(65) Prior Publication Data

US 2008/0306202 A1    Dec. 11, 2008

(51) Int. Cl.
*B60C 1/00* (2006.01)
*C08C 1/06* (2006.01)
*C08K 9/04* (2006.01)
*C08K 9/08* (2006.01)
*G03G 15/16* (2006.01)

(52) U.S. Cl.
CPC ...    *C08K 9/04* (2013.01); *C08K 9/08* (2013.01); *G03G 15/162* (2013.01); *C08K 2201/013* (2013.01)
USPC ............................ 524/495; 524/496; 524/498

(58) Field of Classification Search
USPC ......................................... 524/495, 496, 498
See application file for complete search history.

(56) References Cited

U.S. PATENT DOCUMENTS

| 6,331,265 | B1 * | 12/2001 | Dupire et al. | 264/289.3 |
|---|---|---|---|---|
| 6,641,793 | B2 * | 11/2003 | Haddon et al. | 423/447.2 |
| 6,908,572 | B1 * | 6/2005 | Derbyshire et al. | 252/502 |
| 2002/0197474 | A1 * | 12/2002 | Reynolds | 428/398 |
| 2004/0034177 | A1 * | 2/2004 | Chen | 525/416 |
| 2005/0008561 | A1 * | 1/2005 | Fischer et al. | 423/447.1 |
| 2005/0271879 | A1 * | 12/2005 | Miura et al. | 428/412 |
| 2006/0001013 | A1 * | 1/2006 | Dupire et al. | 252/511 |
| 2006/0058443 | A1 * | 3/2006 | Ohashi et al. | 524/496 |

OTHER PUBLICATIONS

Choi, Tae Y. and Dimos Poulikakos. (2005) Measurement of thermal conductivity of individual multiwalled carbon nanotubes by the 3-w method. Applied Physics Letters, 87 p. 013108-1-012108-3. Online at: http://dx.doi.org/10.1063/1.1957118.*

(Continued)

*Primary Examiner* — Ling Choi
*Assistant Examiner* — Thuy-Ai Nguyen
(74) *Attorney, Agent, or Firm* — MH2 Technology Law Group LLP

(57) ABSTRACT

Exemplary embodiments provide intermediate transfer members that can be used in electrostatographic devices and methods for using them in forming an image. The disclosed intermediate transfer members can include a plurality of nanotubes with high electrical conductivity, high thermal conductivity, and/or low humidity sensitivity. The hydrophobicity of the nanotubes can be controlled by covalently grafting hydrophobic components onto one or more nanotubes; surface treating one or more nanotubes; and encapsulating one or more nanotubes with hydrophobic components. In an exemplary embodiment, the nanotubes can be dispersed in polymer matrices and/or formed on the surface of polymer matrices of the intermediate transfer members. The intermediate transfer members can take various forms of belts, sheets, webs, films, rolls, tubes or any shape that can provide a smooth surface and rotatable function.

11 Claims, 2 Drawing Sheets

(56) References Cited

OTHER PUBLICATIONS

Lin et al., "Functionalizing Multi-Walled Carbon Nanotubes with Poly(Oxyalkylene)-Amidoamines", Nanotechnology, vol. 17, pp. 3197-3203, 2006.

Wang et al., "Noncovalent Functionalization of Multiwalled Carbon Nanotubes: Application in Hybrid Nanostructures", Journal of Physics and Chemistry B, vol. 110, issue 13, pp. 6631-6636, 2006.

Cho et al., "Hydrophobic Coating of Carbon Nanotubes by CH4 Glow Plasma at Low Pressure, and Their Resulting Wettability", Journal of Materials Chemistry, vol. 17, pp. 232-237, 2007.

* cited by examiner

INTERMEDIATE TRANSFER MEMBERS COMPRISED OF HYDROPHOBIC CARBON NANOTUBES

FIELD OF THE INVENTION

This invention relates generally to intermediate transfer members and methods for using them in electrostatographic devices and, more particularly, to intermediate transfer members including hydrophobic carbon nanotubes.

BACKGROUND OF THE INVENTION

Intermediate transfer members are well known and have been used extensively in electrophotographic imaging systems to transfer a developed image. For example, multicolor copying has been achieved with the utilization of an intermediate transfer member in dry electrophotographic printing machines. In this type of device, successive toner powder images are transferred in superimposed registration with one another from the photoconductive drum to an intermediate transfer member. The multicolored image is then transferred to a copy sheet.

The bulk of intermediate transfer members generally include base materials and conductive dopants. For example, polyimide can be used as the base material, and carbon blacks or conductive forms of polyaniline can be used as the conductive dopants. However, these base materials and dopants used in conventional intermediate transfer members have drawbacks and disadvantages. For example, one drawback is that these intermediate transfer members are too humidity sensitive due to the hydrophilic nature of conventional base materials and dopants. Moisture in humid environments will deposit on the devices while idle and cause wrinkles that induces transfer failures and print defects. Currently, there is no easy fix for these humidity issues in the device designs.

Thus, there is a need to overcome these and other problems of the prior art and to provide an intermediate transfer member that alleviates the humidity sensitivity issues.

SUMMARY OF THE INVENTION

According to various embodiments, the present teachings include an intermediate transfer member. The intermediate transfer member can include a plurality of nanotubes incorporated with a polymer matrix. The plurality of nanotubes can be hydrophobic with a water contact angle of about 60° to about 180°.

According to various embodiments, the present teachings also include a method for forming an image with an intermediate transfer member. In this method, an electrostatic latent image can be formed on an image receiving member, developed by a toner to form a toner image, and transferred onto a hydrophobic intermediate transfer member that includes a plurality of nanotubes having a contact angle of about 60° to about 180°. The toner image can then be transferred from the intermediate transfer member onto an image receiving substrate.

According to various embodiments, the present teachings further include an apparatus for forming an image. The apparatus can include an imaging station having an image receiving member and at least one developing station that produces a developed toner image on the image receiving member. The apparatus can also include an intermediate transfer member for receiving the developed toner image from the image receiving member, and transferring the developed toner image to an image receiving substrate. The intermediate transfer member can include a plurality of hydrophobic carbon nanotubes incorporated with a polymer matrix to provide an electrical conductivity, a thermal conductivity, and a low surface free energy.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1A:
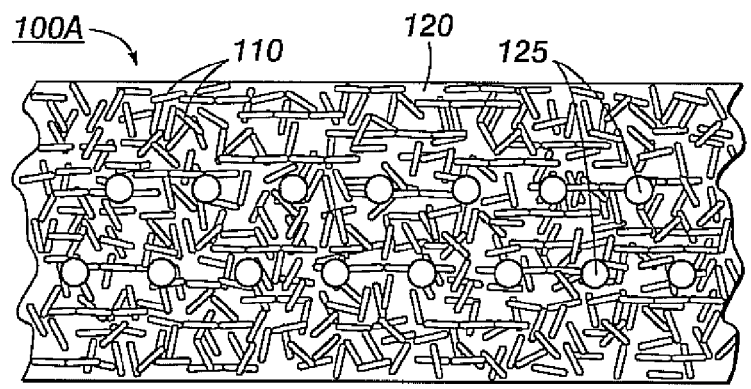
FIGS. 1A-1C are schematics showing sectional views of three exemplary intermediate transfer members in accordance with the present teachings.

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Exemplary embodiments provide intermediate transfer members that can be used in electrostatographic devices and methods for using them in forming an image. The disclosed intermediate transfer members can include a plurality of nanotubes with high electrical conductivity, high thermal conductivity, and low humidity sensitivity, due to the molecular and electrical structures as well as the hydrophobic nature of the disclosed nanotubes. In an exemplary embodiment, the nanotubes can be used as dopants dispersed in polymer matrices and/or formed on the surface of the polymer matrices of the intermediate transfer members. In various embodiments, intermediate transfer members can take various forms, such as, for example, belts, sheets, webs, films, rolls, tubes or any shape that can provide a smooth surface and rotatable function.

As used herein and unless otherwise specified, the term "nanotubes" refers to elongated materials (including organic and inorganic materials) having at least one minor dimension, for example, width or diameter, about 100 nanometers or less. Although the term "nanotubes" is referred to throughout the description herein for illustrative purposes, it is intended that the term also encompass other elongated structures of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

The term "nanotubes" can also include single wall nanotubes such as single wall carbon nanotubes (SWCNTs), multi-wall nanotubes such as multi-wall carbon nanotubes (MWCNTs), and their various functionalized and derivatized fibril forms such as nanofibers. The term "nanotubes" can also include carbon nanotubes including SWCNTs and/or MWCNTs. The term "nanotubes" can further include hydrophobic nanotubes including hydrophobic SWCNTs and/or hydrophobic MWCNTs. Finally, the term "nanotubes" can include modified nanotubes from all possible nanotubes thereabove and their combinations. The modification of the nanotubes can include a physical and/or a chemical modification.

The nanotubes can have various cross sectional shapes, such as, for example, rectangular, polygonal, oval, or circular shape. Accordingly, the nanotubes can have, for example, cylindrical 3-dimensional shapes.

The nanotubes can be formed of conductive or semi-conductive materials. In some embodiments, the nanotubes can be obtained in low and/or high purity dried paper forms or can be purchased in various solutions. In other embodiments, the nanotubes can be available in the as-processed unpurified condition, where a purification process can be subsequently carried out.

The nanotubes can provide exceptional and desired functions, such as, electrical (e.g., conductivity), thermal (e.g., conductivity), and/or surface (e.g., hydrophobicity) functions to the intermediate transfer members.

For example, the nanotubes can have a high electrical conductivity of about $1 \times 10^{-3}$ s.cm$^{-1}$ to about $1 \times 10^{6}$ s.cm$^{-1}$. In an exemplary embodiment, the nanotubes can have an electrical conductivity of about $5 \times 10^{-5}$ s.cm$^{-1}$, which is comparable to that of copper. In another example, the nanotubes, such as SWCNTs, can have a thermal conductivity of about 1 W/mK to about 1000 W/mK at room temperature, such as about 500 W/mK.

The nanotubes can be hydrophobic and can have a contact angle of about 60° to about 180°. For example, synthesized SWCNTs and/or MWCNTs can be hydrophobic, e.g., having an exemplary contact angle of about 70° to about 90°, from purchase (e.g., from Carbon Nanotechnologies, Inc. (Houston, Tex.)). In addition, the nanotubes can be modified/functionalized nanotubes with controlled and/or increased hydrophobicity through various physical and/or chemical modifications using, for example, hydrophobic polymers. In various embodiments, the hydrophobicity of the nanotubes can be increased by methods, such as, for example, covalently grafting hydrophobic components onto the surface of the nanotubes, chemically treating the surface of the nanotubes, and encapsulating the nanotubes with hydrophobic components.

In an exemplary embodiment, the nanotubes can be organically modified (e.g., grafted) through chemical reactions to provide a high surface hydrophobicity. For example, MWCNTs can be functionalized by sequential HNO$_3$ oxidation and amidation using modifying agents such as poly(oxyalkylene)-amines (i.e., POA-amines) to produce nanotube-tethering organic portions having a hydrophobic polyether backbone, such as poly(oxypropylene) (POP). In this example, the POA-amines can include POA-backboned monoamines and/or diamines having hydrophobic POP groups. The chemical structure of the exemplary hydrophobic POA-diamines can be shown as following:

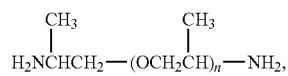

wherein this structure has a predominant POP hydrophobic group. Depending on the fraction (determined by n in the chemical structure) of this POP group, POA-diamine can have different molecular weight and thus different hydrophobicity. For example, the molecule weight of POA-diamines can be about 400, when n is about 5 to 6; and when n is about 33, the molecule weight of POA-diamines can be about 2000 and provide a higher hydrophobicity to the nanotubes. In addition, the hydrophobicity of the resulting nanotubes can be increased by increasing the grafted organic fraction on the nanotubes, for example, from about 25% to about 45%.

In another exemplary embodiment, super hydrophobic nanotubes can be obtained by, for example, a hydrophobic surface treatment using plasma or electron beams of various gases such as hydrocarbon gases including, but not limited to, methane, heptane, and octane. For example, commercially available carbon nanotubes (CNTs) can be treated by methane glow discharge plasma system to provide the CNTs a super hydrophobic surface having an exemplary contact angle of about 160° to about 180°. Table 1 depicts an exemplary comparison of contact angles and surface free energy of the carbon nanotubes (CNTs) before and after the methane plasma surface treatment in accordance with the present teachings.

TABLE 1

| CNT | Contact angle θ (°) | | | Surface Free Energy |
| --- | --- | --- | --- | --- |
| | $\theta_{Water}$ | $\theta_{Glycerol}$ | $\theta_{Formamide}$ | $\gamma$ (mM m$^{-1}$) |
| Without Surface Treatment | 89.5 | 89.1 | 77.5 | 27.04 |
| With Surface Treatment | 180 | 179.9 | 162.7 | $1.32 \times 10^{-7}$ |

As depicted in table 1, the commercially available CNT powders can have a hydrophobic contact angle, for example, ranging from about 77.5° in formamide solvent to about 89.5° in water. However, the methane treated CNT powders can provide a super hydrophobic contact angle, for example, ranging from about 162.7° in formamide solvent to about 180° in water. Meanwhile, as shown, the surface free energy (e.g., total surface free energy calculated from the van Oss-Chaudhury-Good equation) can be dramatically decreased by the plasma treatment on the surface of CNTs. Therefore, by treating CNT powders with exemplary $CH_4$ glow discharge plasma, the CNT powders can provide a super hydrophobic surface with decreased surface free energy. Such carbon nanotubes having super hydrophobic surfaces with a decreased surface free energy can provide the intermediate transfer members a low sensitivity to environmental variations such as humidity, as well as a reduced contamination, and non-tacky or non-sticky surfaces towards, for example, toner particles and the photoreceptor.

The hydrophobic nanotubes, having high electrical and thermal conductivities, can be incorporated into/onto a polymer matrix to form intermediate transfer members with a weight loading of, for example, about 1% to about 70%.

Figure 1B:
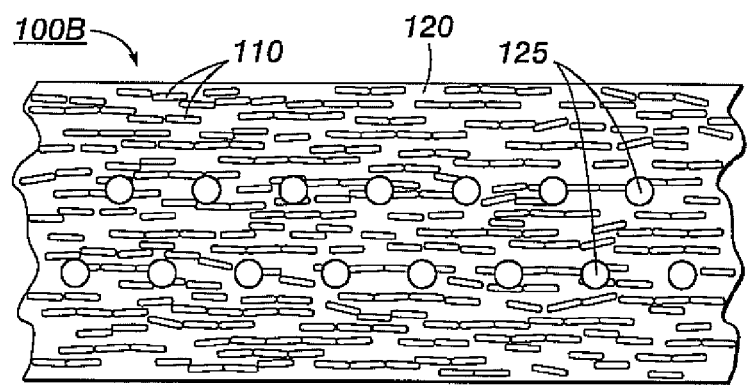
Figure 1C:
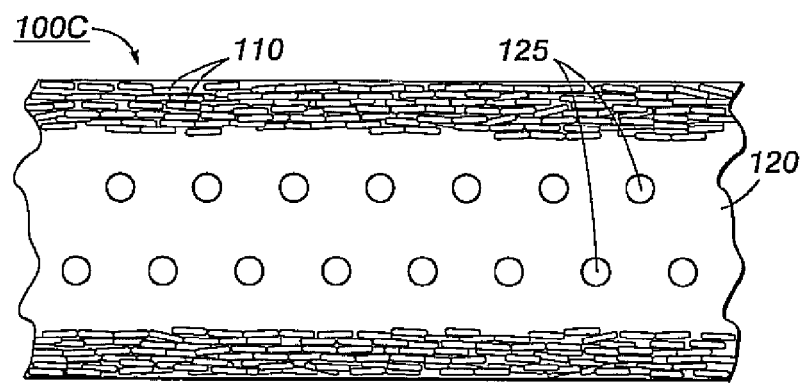

In various embodiments, the disclosed nanotubes can be incorporated with the polymer matrices of the intermediate transfer members by, for example, distributing in the polymer matrices and/or forming onto the surfaces of polymer matrices, as depicted in the schematic views of FIGS. 1A-1C. Accordingly, the intermediate transfer members can be formed by, for example, mixing the nanotubes into the preparation of the polymer matrices, and/or coating or spreading nanotubes onto the surface of formed polymer matrices.

FIGS. 1A-1C are schematics showing sectional views of three exemplary intermediate transfer members 100A, 100B, and 100C in accordance with the present teachings. As shown, each of the intermediate transfer members in FIGS. 1A-1C can further include a plurality of nanotubes 110 as disclosed herein. Although the plurality of nanotubes 110 is depicted having a consistent size in FIGS. 1A-1C, one of ordinary skill in the art will understand that the plurality of nanotubes 110 can have different sizes, for example, different lengths, widths and/or diameters. In addition, each intermediate transfer member shown in FIGS. 1A-1C can further include a polymer matrix 120, and dopants 125. It should be readily apparent to one of ordinary skill in the art that each intermediate transfer member depicted in FIGS. 1A-1C represents a generalized schematic illustration and that other nanotubes/dopants/layers can be added or existing nanotubes/dopants/layers can be removed or modified.

The polymer matrix 120 can include a variety of polymers for each intermediate transfer members in FIGS. 1A-1C. For example, the polymer matrix 120 can be made of and/or from polymers including polyimide, polyethyleneimide, polycarbonate, polyarylate, polyester, poly(methyl methacrylate), poly(methyl acrylate), poly(ethyl acrylate), polyurethane, polyamide, polyolefin, cellulose or a compound thereof, styrene resins or copolymer thereof, acrylic resins, vinyl copolymer, rosin or rosin ester resins, natural or synthetic rubbers, epoxy resin or phenolic resin.

The dopants 125 can include a variety of fillers and/or additives known to one of the ordinary skill in the art that can be dispersed in the polymer matrix 120 of each intermediate transfer member shown in FIGS. 1A-1C. Exemplary fillers can include, but are not limited to, carbon, graphite, $SnO_2$, $TiO_2$, $In_2O_3$, ZnO, MgO, $Al_2O_3$, and metal powders such as Al, Ni, Fe, Zn, or Cu. Exemplary additives can include, but are not limited to, plasticizers, softening agents, dispersant aids, and compatibilizers.

In FIG. 1A, the plurality of nanotubes 110 can be dispersed randomly in or throughout the polymer matrix 120. For example, this distribution can include bundled nanotubes 110 with random tangles throughout the polymer matrix 120 of the intermediate transfer member 100A. In another example, the nanotubes 110 can be dispersed uniformly throughout the polymer matrix 120.

In FIG. 1B, the plurality of nanotubes 110 can be spatially-controlled, for example, be aligned or oriented at certain directions, throughout the polymer matrix 120 of the intermediate transfer member 100B by, for example, use of a magnetic field.

In various embodiments, the plurality of nanotubes 110 shown in FIGS. 1A-1C can be distributed in the polymer matrix 120 of each intermediate transfer member by a physical mixing (i.e., non-covalent mixing) and/or a chemical mixing (i.e., covalent reaction). In Various embodiments, a sonication process or other enhanced mixing processes can be used during the physical and/or chemical mixings.

In an exemplary embodiment of a chemical mixing, the plurality of nanotubes 110 can be covalently bonded to the polymer materials of the polymer matrices 120 by, for example, chemical modifications on nanotube surfaces followed by chemical reactions between the modified nanotubes and the polymer materials. In another exemplary example, the nanotubes 110 can be incorporated into the preparation of the polymer materials during, for example, in-situ processes, such as an in-situ polymerization and/or an in-situ curing process, of the polymers of interest. For example, carbon nanotubes can be dispersed uniformly throughout a polyimide matrix during an in-situ polymerization of the polyimide monomers. In another example, carbon nanotubes can be dispersed throughout an epoxy type polymer matrix during the curing process of the epoxy.

In FIG. 1C, the plurality of nanotubes 110 can be incorporated with the polymer matrix 120 by, for example, spreading, casting, coating or dipping the nanotubes onto the surface of the formed polymer matrix 120.

In an exemplary embodiment, the disclosed nanotubes 110 can be dissolved in a solution first, in order to be formed onto the surface of the polymer matrix 120. For example, organically modified hydrophobic nanotubes can have high solubility in organic solvents, such as toluene or THF. That is, these organophilic CNTs can be soluble in organic solvents and subsequently be spread or coated (e.g., spin-coated) on a target surface of, e.g., the polymer matrix 120 in FIG. 1C. The CNT coated polymer matrix can then be evacuated to remove the organic solvents under vacuum. In another example, hydrophobic MWCNTs or SWCNTs can be embedded in a hydrophilic shell, which can facilitate the hydrophobic nanotubes dispersed in water environment during the formation onto the surface of the polymer matrix 120.

In various embodiments, the disclosed intermediate transfer members can include a plurality of hydrophobic nanotubes both dispersed throughout the polymer matrix (e.g., randomly, uniformly and spatially-controlled as shown in FIGS. 1A-1B) and coated on surface of the polymer matrix (see FIG. 1C). In various embodiments, the disclosed intermediate transfer members can have a bulk electrical resistivity of about $1\times10^4$ to about $1\times10^{13}$ ohm-cm.

Figure 2:
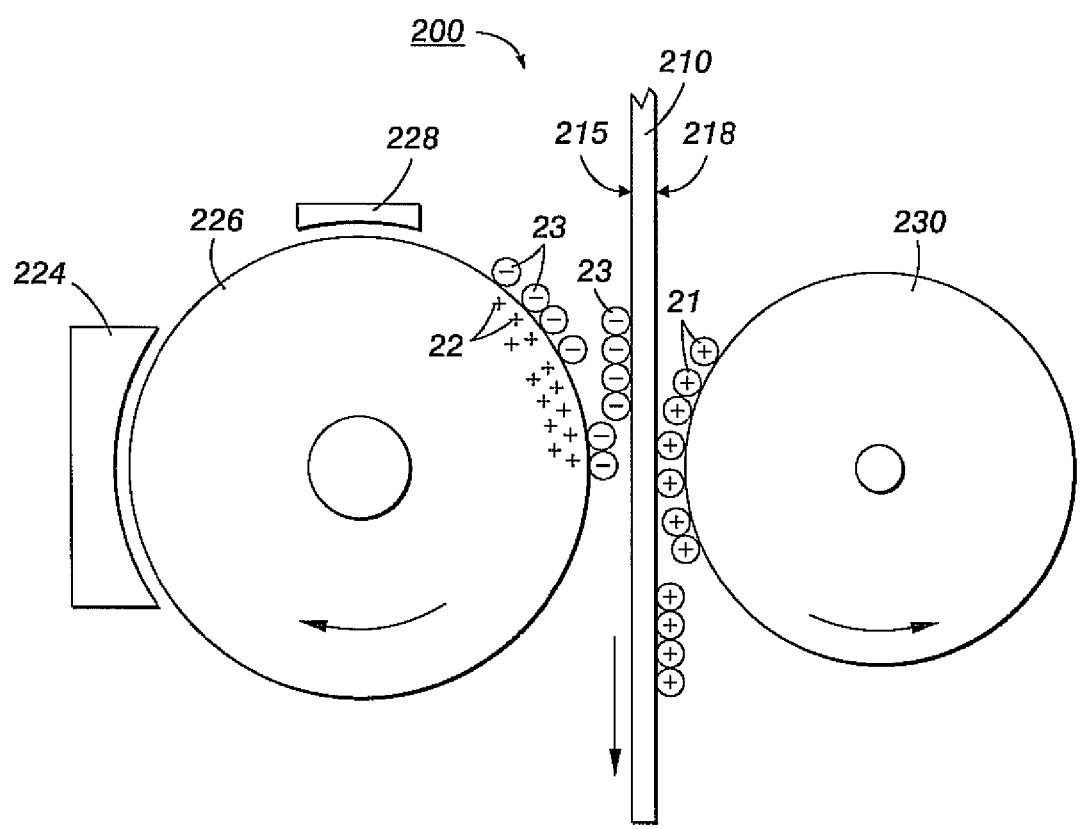
FIG. 2 depicts an exemplary image development system using an intermediate transfer member in accordance with the present teachings.

The intermediate transfer members having nanotubes can be used in image development systems in electrostatographic devices for an image forming process on an image receiving substrate, for example, a paper sheet. FIG. 2 is a schematic of an exemplary image development system 200 using an intermediate transfer member 210 in accordance with the present teachings. In various embodiments, the system 200 can be a multi-imaging system. As shown, the system 200 can include an intermediate transfer member 210, an imaging station including an image input apparatus 224 and an image receiving member 226 along with a developing station 228, and a transfer roller 230. The intermediate transfer member 210 can be positioned between the image receiving member 226 and the transfer roller 230. It should be readily apparent to one of ordinary skill in the art that the image development system 200 depicted in FIG. 2 represents a generalized schematic illustration and that other members/stations/transfer means can be added or existing members/stations/transfer means can be removed or modified.

Generally, in an electrostatographic reproducing apparatus, a light image of an original to be copied can be recorded in the form of an electrostatic latent image upon a photosensitive member (e.g., the image receiving member 226) and the latent image can be subsequently rendered visible by the application of electroscopic thermoplastic resin particles which are commonly referred to as toner.

Referring to FIG. 2, the image receiving member 226 can be charged and can be image-wisely exposed to light from an optical system or an image input apparatus (e.g., 224) to form an electrostatic latent image thereon. The electrostatic latent image can then be developed by bringing a developer mixture (including toner) from the developing station 228 into contact therewith, resulting in a developed image. The developed image can then be transferred to the intermediate transfer member 210 and subsequently transferred to, for example, a copy sheet (not shown) having a permanent image thereon.

The intermediate transfer member 210 can include a plurality of nanotubes with high electrical conductivity and high thermal conductivity as well as hydrophobic wettability. The intermediate transfer member 210 can have various forms including, but not limit to, a belt, a sheet, a web, a film, a roil, and a tube. The intermediate transfer member 210 can be one of the intermediate transfer members as described in FIGS. 1A-1C.

The image input apparatus 224, for example, a laser or a light emitting diode, can be an image forming apparatus to form and transfer an image on the image receiving member 226. The image receiving member 226 can be exemplified by a photoreceptor drum as shown in FIG. 2, although other appropriate imaging members, for example, other electrostatographic imaging receptors such as ionographic belts and drums, or electrophotographic belts, can also be used for the system 200. The image receiving member 226 can be charged on its surface by means of, for example, a charger or a power supply to provide a voltage. The image receiving member 226 can have a photoconductive surface.

The developing station 228 can develop the image that has been transferred on the image receiving member 226 from the image input apparatus 224. The development can be effected by use of, for example, a magnetic brush, powder cloud, or other known development process. In various embodiments, one or more image input apparatuses 224 and/or one or more developing stations 228 can be configured in the system 200.

Subsequent to the image development, the charged toner particles 23 from the developing station 228 can be attracted and held by the image receiving member 226 (e.g., photoreceptor drum), because the photoreceptor drum possesses a charge 22 opposite to that of the toner particles 23. It is noted in FIG. 2 that the toner particles 23 are shown as negatively charged and the photoreceptor drum 226 is shown as positively charged. In various embodiments, these charges can be reversed, depending on the nature of the toner and the machinery being used. In an exemplary embodiment, the toner can be present in a liquid developer. However, one of ordinary skill in the art will understand that the system 200 can also be useful for dry development systems. After the toner particles have been deposited on the photoconductive surface of the image receiving member 226, the developed image can be transferred to the intermediate transfer member 210.

In this manner, in a multi-image system for example, each of the images can be formed on the exemplary photoreceptor drum (see 226) by the image input apparatus 224, developed sequentially by the developing station 228, and transferred to the intermediate transfer member 210, when each image involves a liquid image. In an alternative method, each image can be formed on the photoreceptor drum, developed, and transferred in registration to the intermediate transfer member 210, when each image involves a dry image.

In an exemplary embodiment, the multi-image system can be a color copying system. In this color copying system, each color of an image being copied can be formed on the photoreceptor drum (see 226). Each color image can be developed and transferred to the intermediate transfer member 210. In an alternative method, each color of an image can be formed on the photoreceptor drum (see 226), developed, and transferred in registration to the intermediate transfer member 210.

The transfer roller 230 can be positioned opposite to the photoreceptor drum 226 having the intermediate transfer member 210 therebetween. The transfer roller 230 can be a biased transfer roller having a higher voltage than the surface of the photoreceptor drum. The biased transfer roller 230 can charge the backside 218 of the intermediate transfer member 210 with, for example, a positive charge. Alternatively, a corona or any other charging mechanism can be used to charge the backside 218 of the intermediate transfer member 210. Meanwhile, the negatively charged toner particles 23 can be attracted to the front side 215 of the intermediate transfer member 210 by the exemplary positive charge 21 on the backside 218 of the intermediate transfer member 210.

After the toner latent image has been transferred from the exemplary photoreceptor drum (see 226) to the intermediate transfer member 210, the intermediate transfer member 210 can be contacted under heat and pressure to an image receiving substrate (not shown). The toner image on the intermediate transfer member 210 can then be transferred and fixed (as permanent image) to the image receiving substrate (not shown) such as a copy sheet.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An image forming apparatus comprising:
a humidity resistant intermediate transfer member for transferring a developed toner image to an image receiving substrate, the humidity resistant intermediate transfer member comprising:
a polymer matrix; and
a plurality of nanotubes incorporated into the polymer matrix,
wherein the plurality of nanotubes are hydrophobic with a water contact angle of about 160° to about 180°, the plurality of nanotubes comprise organically modified nanotubes, the organically modified nanotubes comprise nanotube-tethering organic portions having a hydrophobic polyether backbone, the hydrophobic polyether backbone comprises a poly(oxypropylene) hydrophobic group, and the humidity resistant intermediate transfer member has a bulk electrical resistivity of about $1\times10^4$ ohm-cm to about $1\times10^{13}$ ohm-cm.

2. The apparatus of claim 1, wherein each of the plurality of nanotubes comprises a single wall carbon nanotube (SWCNT) or a multi-wall carbon nanotube (MWCNT).

3. The apparatus of claim 1, wherein the plurality of nanotubes has an electrical conductivity of about $1\times10^{-3}$ s.cm$^{-1}$ to about $1\times10^6$ s.cm$^{-1}$.

4. The apparatus of claim 1, wherein the plurality of nanotubes has a thermal conductivity of about 1 W/mK to about 1000 W/mK.

5. The apparatus of claim 1, wherein the humidity resistant intermediate transfer member is in a form selected from the group consisting of a belt, a roll, a tube, a sheet, a web and a film.

6. The apparatus of claim 1, wherein each of the plurality of nanotubes has a cross sectional shape selected from the group consisting of a polygon, a rectangle, an oval, and a circle.

7. The apparatus of claim 1, wherein the polymer matrix comprises one or more polymers selected from the group consisting of polyimide, polyethyleneimide, polycarbonate, polyarylate, polyester, poly(methyl methacrylate), poly(methyl acrylate), poly(ethyl acrylate), polyurethane, polyamide, polyolefin, cellulose or a compound thereof, styrene resins or copolymer thereof, acrylic resins, vinyl copolymer, rosin or rosin ester resins, natural or synthetic rubbers, epoxy resin and phenolic resin.

8. The apparatus of claim 1, wherein the polymer matrix further comprises a filler selected from the group consisting of carbon, graphite, $SnO_2$, $TiO_2$, $In_2O_3$, ZnO, MgO, $Al_2O_3$, Al, Ni, Fe, Zn, and Cu.

9. The apparatus of claim 1, wherein the polymer matrix further comprises an additive selected from the group consisting of plasticizer, softening agent, dispersant aid, and compatibilizer.

10. The apparatus of claim 1, wherein the plurality of organically modified nanotubes further comprise a grafted organic fraction from about 25% to about 45%.

11. The apparatus of claim 1, wherein the plurality of nanotubes incorporated into the polymer matrix comprise at least one of nanotubes that are distributed in the polymer matrix by non-covalent mixing and nanotubes that are distributed in the polymer matrix by covalent bonding to a polymer material of the polymer matrix.

* * * * *